United States Patent

Sincan et al.

(10) Patent No.: US 9,529,684 B2
(45) Date of Patent: Dec. 27, 2016

(54) METHOD AND SYSTEM FOR HARDWARE IMPLEMENTATION OF UNIFORM RANDOM SHUFFLING

(71) Applicant: Ixia, Calabasas, CA (US)

(72) Inventors: Sergiu Sincan, Bucharest (RO); Neil Messmer, Langley (CA)

(73) Assignee: IXIA, Calabasas, CA (US)

( * ) Notice: Subject to any disclaimer, the term of this patent is extended or adjusted under 35 U.S.C. 154(b) by 297 days.

(21) Appl. No.: 14/251,547

(22) Filed: Apr. 11, 2014

(65) Prior Publication Data

US 2015/0293826 A1 Oct. 15, 2015

(30) Foreign Application Priority Data

Apr. 10, 2014 (RO) .............. A/00283/2014

(51) Int. Cl.
*G06F 7/58* (2006.01)
*G06F 11/263* (2006.01)
*H04L 12/26* (2006.01)

(52) U.S. Cl.
CPC ............. *G06F 11/263* (2013.01); *H04L 43/50* (2013.01)

(58) Field of Classification Search
None
See application file for complete search history.

(56) References Cited

U.S. PATENT DOCUMENTS

| | | | |
|---|---|---|---|
| 6,542,854 B2 | 4/2003 | Yang et al. |
| 6,769,054 B1 | 7/2004 | Sahin et al. |
| 6,792,393 B1 | 9/2004 | Farel et al. |
| 7,328,134 B1 | 2/2008 | Burbidge, III et al. |

(Continued)

FOREIGN PATENT DOCUMENTS

| | | |
|---|---|---|
| WO | WO 2014/160660 A1 | 10/2014 |
| WO | WO 2015/023369 A1 | 2/2015 |

OTHER PUBLICATIONS

"Fisher-Yates Shuffle," http://en.wikipedia.org/wiki/Fisher-Yates_shuffle, pp. 1-11, May 8, 2014 (retrieved on May 27, 2014).
Commonly-assigned, co-pending U.S. Appl. No. 14/158,659 for Methods, Systems, and Computer Readable Media for Selecting Numbers from Multiple Ranges (Unpublished, filed Jan. 17, 2014).
"ImpairNetTM—EIM1G4S, EIM10G4S, and EIM40G2Q Ethernet Impairment Load Module," pp. 1-5, Jul. 2013 (retrieved on May 27, 2014).
Corrected Notice of Allowability for U.S. Appl. No. 14/158,659 (Jan. 11, 2016).

(Continued)

*Primary Examiner* — David H Malzahn
(74) *Attorney, Agent, or Firm* — Jenkins, Wilson, Taylor & Hunt, P.A.

(57) ABSTRACT

Methods and systems for hardware implementation of uniform random shuffling are disclosed. According to one aspect, a system for hardware implementation of uniform random shuffling includes multiple pseudo-random bit sequence (PRBS) generators, where each PRBS generator provides a pseudo-random sequence of numbers S and the next value in its pseudo-random sequence in response to receiving an output request. The system also includes selection logic for creating a sequence of output values O by repetitively selecting one of the plurality of modules according to a random selection function and sending an output request to the selected module, wherein the sequence of values O created from the output of the randomly selected modules comprises a uniform, randomly shuffled sequence. The probability that a PRBS generator will be selected is weighted based on the number N of pseudo-random values that have not yet been output out of L possible values in the sequence.

21 Claims, 6 Drawing Sheets

(56) References Cited

U.S. PATENT DOCUMENTS

| | | | |
|---|---|---|---|
| 7,890,951 | B2 | 2/2011 | Vinberg et al. |
| 8,984,341 | B1 | 3/2015 | Chandrasekharapuram et al. |
| 9,317,252 | B2* | 4/2016 | Roy .................... G06F 7/582 |
| 2002/0087282 | A1 | 7/2002 | Millard |
| 2002/0184614 | A1 | 12/2002 | Davia et al. |
| 2003/0036897 | A1 | 2/2003 | Flores et al. |
| 2003/0154432 | A1 | 8/2003 | Scott et al. |
| 2003/0182408 | A1 | 9/2003 | Hu |
| 2004/0015600 | A1 | 1/2004 | Tiwary et al. |
| 2004/0139437 | A1 | 7/2004 | Arndt |
| 2005/0216234 | A1 | 9/2005 | Glas et al. |
| 2006/0025985 | A1 | 2/2006 | Vinberg et al. |
| 2006/0037002 | A1 | 2/2006 | Vinberg et al. |
| 2007/0067374 | A1* | 3/2007 | Iketani .................... G06F 7/588 708/250 |
| 2007/0069005 | A1 | 3/2007 | Dickerson et al. |
| 2007/0112549 | A1 | 5/2007 | Lau et al. |
| 2008/0208554 | A1 | 8/2008 | Igarashi |
| 2008/0221857 | A1 | 9/2008 | Casotto |
| 2009/0089038 | A1 | 4/2009 | Nadgir et al. |
| 2009/0259704 | A1 | 10/2009 | Aharoni et al. |
| 2010/0111494 | A1 | 5/2010 | Mazzaferri |
| 2010/0153529 | A1 | 6/2010 | Moser |
| 2010/0161864 | A1 | 6/2010 | Barde et al. |
| 2011/0066786 | A1 | 3/2011 | Colbert |
| 2011/0246171 | A1 | 10/2011 | Cleeton et al. |
| 2011/0307739 | A1 | 12/2011 | El Mahdy et al. |
| 2012/0054740 | A1 | 3/2012 | Chakraborty et al. |
| 2012/0060167 | A1 | 3/2012 | Salsburg et al. |
| 2012/0192182 | A1 | 7/2012 | Hayward et al. |
| 2012/0311387 | A1 | 12/2012 | Santhosh et al. |
| 2013/0013657 | A1* | 1/2013 | Emelko .................... G06F 7/588 708/251 |
| 2013/0055026 | A1 | 2/2013 | Hatano et al. |
| 2013/0282354 | A1 | 10/2013 | Sayers et al. |
| 2013/0297769 | A1 | 11/2013 | Chang et al. |
| 2014/0006358 | A1 | 1/2014 | Wang et al. |
| 2014/0013306 | A1 | 1/2014 | Gounares et al. |
| 2014/0047272 | A1 | 2/2014 | Breternitz et al. |
| 2014/0067940 | A1 | 3/2014 | Li et al. |
| 2014/0068335 | A1 | 3/2014 | Bromley et al. |
| 2014/0108001 | A1 | 4/2014 | Brown et al. |
| 2014/0298335 | A1 | 10/2014 | Regev et al. |
| 2014/0378057 | A1 | 12/2014 | Ramon et al. |
| 2015/0046141 | A1 | 2/2015 | Lahiri et al. |
| 2015/0120797 | A1 | 4/2015 | Roy et al. |
| 2015/0135178 | A1 | 5/2015 | Fischer et al. |
| 2015/0140956 | A1 | 5/2015 | Prewitt, II et al. |
| 2015/0293826 | A1* | 10/2015 | Sincan .................... H04L 43/50 714/712 |
| 2016/0034372 | A1 | 2/2016 | Panda et al. |

OTHER PUBLICATIONS

Notice of Allowance and Fee(s) Due for U.S. Appl. No. 14/158,659 (Dec. 11, 2015).

Non-Final Office Action for U.S. Appl. No. 14/445,921 (Jan. 14, 2016).

Notice of Allowance and Fee(s) Due for U.S. Appl. No. 13/969,085 (Aug. 10, 2016).

Notice of Allowance and Fee(s) Due for U.S. Appl. No. 14/749,606 (Jul. 27, 2016).

Applicant-Initiated Interview Summary for U.S. Appl. No. 14/224,024 (Jul. 18, 2016).

Final Office Action for U.S. Appl. No. 14/224,024 (Jun. 15, 2016).

Applicant-Initiated Interview Summary for U.S. Appl. No. 13/969,085 (Jun. 7, 2016).

Communication of European publication number and information on the application of Article 67(3) EPC for European Application No. 14836839.2 (May 25, 2016).

Applicant-Initiated Interview Summary for U.S. Appl. No. 14/224,024 (May 13, 2016).

Notice of Allowance and Fee(s) Due for U.S. Appl. No. 14/445,921 (May 12, 2016).

Final Office Action for U.S. Appl. No. 13/969,085 (Apr. 19, 2016).

Applicant-Initiated Interview Summary for U.S. Appl. No. 14/445,921 (Apr. 14, 2016).

Non-Final Office Action for U.S. Appl. No. 14/224,024 (Feb. 3, 2016).

Non-Final Office Action for U.S. Appl. No. 13/969,085 (Sep. 24, 2015).

Commonly-assigned, co-pending U.S. Appl. No. 14/749,606 for "Methods, Systems, and Computer Readable Media for Emulating Computer Processing Usage Patterns on a Virtual Machine," (Unpublished, filed Jun. 24, 2015).

"IxVM: Validating Virtualized Assets and Environments," Ixia, Data Sheet, pp. 1-8 (Jun. 2015).

Notification of Transmittal of the International Search Report and the Written Opinion of the International Searching Authority, or the Declaration for PCT International Application No. PCT/US2014/045658 (Oct. 30, 2014).

Notification of Transmittal of the International Search Report and the Written Opinion of the International Searching Authority, or the Declaration for PCT International Application No. PCT/US2014/031637 (Jul. 31, 2014).

"IxLoad: Specifications," https://web.archive.org/web/20130901094417 1http://www.ixiacom.com/products/network_test/applications/ixload/specifications/index.php. pp. 1-5 (Sep. 1, 2013).

"IxLoad" Ixia, Solution Brief, pp. 1-4 (Feb. 2012).

\* cited by examiner

METHOD AND SYSTEM FOR HARDWARE IMPLEMENTATION OF UNIFORM RANDOM SHUFFLING

PRIORITY CLAIM

This application claims the benefit of Romanian Patent Application No. A/0028312014, filed Apr. 10, 2014; the disclosure of which is incorporated herein by reference in its entirety.

TECHNICAL FIELD

The subject matter described herein relates to methods and systems for producing uniform randomly shuffled packets for transmission by a test packet generation system. More particularly, the subject matter described herein relates to methods and systems for a hardware implementation of uniform random shuffling.

BACKGROUND

In packet networks, packets are not guaranteed to arrive in the same order that they were sent, and so certain nodes on the packet network must be able to process and reassemble packets regardless of the order received. Individual packets may be likewise fragmented, and a node on the packet network must be able to reassemble the packet fragments correctly regardless of the order that the fragments are received. To test this capability, it is desirable to provide randomly shuffled packets or packet fragments to a node under test, to determine how well that node reassembles the fragments.

The problem to be solved is how to generate unbiased random permutations of an arbitrary number of indices in hardware at a rate of at least one index per frame, which, assuming a minimum frame size of 64 bytes, 8 bytes preamble and 12 bytes gap, translates to one index per 16.8 ns in 40 Gbps networks and one every 6.72 ns at 100 Gbps. The indices so produced are used to construct and output packet fragments in random order. The number of fragments may range from 2 to 144 in a typical application.

These indices must (1) follow a uniform distribution and (2) ensure reasonable coverage. Because there are $A_{144}^{144}=144!\cong 5.55\cdot 10^{249}\cong 0.775\cdot 2^{830}$ ways of reordering 144 fragments, full coverage would require a seed space of 830 bits. Hardware having 830 bit wide data paths that can operate at the required frequency would be unwieldy and expensive. Hardware having a 32 bit wide data path is more common, but for a seed space size of 32 bits, the largest number of fragments for which full coverage is possible is F=12 fragments, which is much less than the needed 144.

Accordingly, in light of these disadvantages associated with conventional approaches to providing unbiased random permutations at full coverage, there exists a need for methods and systems for hardware generation of sequences that are statistically similar to a uniform random sample of all possible sequences. More specifically, there exists a need for a hardware implementation of uniform random shuffling.

SUMMARY

According to one aspect, the subject matter described herein includes a system for hardware implementation of uniform random shuffling. The system includes multiple pseudo-random bit sequence (PRBS) generators, where each PRBS generator provides a pseudo-random sequence of numbers S, where each module outputs the next value in its pseudo-random sequence in response to receiving an output request. The system also includes selection logic for creating a sequence of output values O by repetitively selecting one of the plurality of modules according to a random selection function and sending an output request to the selected module, wherein the sequence of values O created from the output of the randomly selected modules comprises a uniform, randomly shuffled sequence. The probability that a PRBS generator will be selected is weighted based on the number N of pseudo-random values that have not yet been output out of L possible values in the sequence.

As used herein, the term "PRBS sequence" refers to the full set of pseudorandom values produced by a particular PRBS generator.

As used herein, the terms "shuffle sequence", "output sequence", and "output values" are synonyms that refer to the uniform random shuffled sequence of values produced collectively by one or more pseudorandom bit sequence generators operating together according to principles described herein.

As used herein, the term "full shuffle sequence" and "complete output sequence" are synonyms that refer to an output having values that represent the complete PRBS sequences from all active PRBS generators. When a full shuffle sequence has been completed, all possible values in the intended range of output values have been produced in random order. Production of a full shuffle sequence may also be referred to as "a run".

According to another aspect, the subject matter described herein includes a method for hardware implementation of uniform random shuffling. The method includes using hardware for generating pseudo-random sequences to provide a plurality of sets of numbers, each set being a pseudo-random sequence and representing a subset of all possible values of a randomly shuffled sequence O, where all sets combined represent all values of sequence O. Sequence O is produced by repetitively selecting the next value of a randomly or pseudo-randomly selected set as the next value in sequence O.

According to yet another aspect, the subject matter described herein includes a system for performing impairment testing of a packet network device. The system includes a shuffling module for randomly shuffling a set of numbers to create a shuffling sequence O, where the shuffling module includes multiple modules that each generate its own pseudo-random sequence of numbers and that outputs the next value in its pseudo-random sequence in response to receiving an output request. The shuffling module also includes selection logic for creating shuffling sequence O by repetitively selecting one of the multiple modules at random and sending an output request to the selected module. The shuffling sequence O created from the output of the randomly selected modules is a uniform, randomly shuffled sequence. The system also includes a packet reordering module for fragmenting a first network packet into a set of sequentially ordered fragments, for shuffling the order of the fragments according to the shuffling sequence O, and for sending the shuffled fragments to an output module for transmission to a device under test.

According to yet another aspect, the subject matter described herein includes a method for performing impairment testing of a packet network device. The method includes using hardware to generate multiple sets of pseudo-random sequences and creating a randomly shuffled output sequence O by repetitively selecting the next value of a randomly or pseudo-randomly selected set as the next value in the sequence O until all values of sequence O have been produced; using the produced sequence O to shuffle fragments of a first network packet to create a second network packet having shuffled fragments; and transmitting the second network packet to a device under test.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media for a hardware implementation of uniform random shuffling are provided. Reference will now be made in detail to exemplary embodiments of the present invention, examples of which are illustrated in the accompanying drawings. Wherever possible, the same reference numbers will be used throughout the drawings to refer to the same or like parts.

To generate sequences that are statistically similar to a uniform random sample of all possible sequences, the methods and systems disclosed herein interleave, via a correctly biased random selection, smaller permutations of the binary representation of the number of indices. These power of two permutations lend themselves well to hardware implementation. In one embodiment, pseudorandom permutations of $2^i$ are interleaved to obtain unbiased permutations of indices of arbitrary size. In one embodiment, the permutations so produced are further processed to improve coverage of permutations of $2^i$ without the need for multiple shift register feedback functions.

Figure 1:
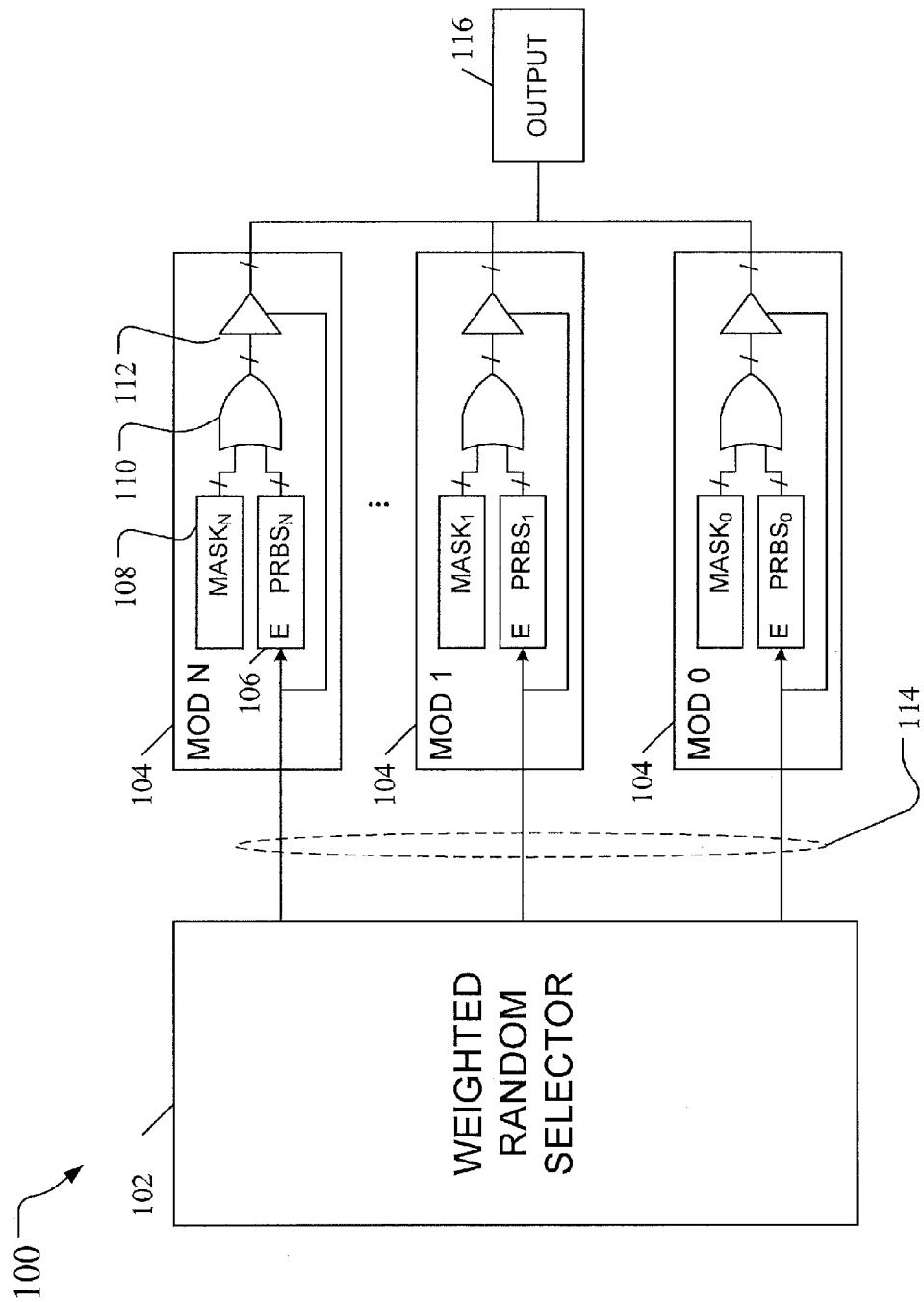
FIG. 1 is a block diagram illustrating an exemplary system for hardware implementation of uniform random shuffling according to an embodiment of the subject matter described herein.

FIG. 1 is a block diagram illustrating an exemplary system for hardware implementation of uniform random shuffling according to an embodiment of the subject matter described herein. In the embodiment illustrated in FIG. 1, system 100 includes a weighted random selector module 102 that selects one of a plurality of modules 104, each for generating a pseudorandom permutation of 2' values.

Each module 104 includes a pseudo-random bit sequence generator ($PRBS_N$) 106 and a mask register ($MASK_N$) 108, which modifies the output of the PRBS. In the embodiment illustrated in FIG. 1, for example, the output of PRBS 106 and MASK 108 are logically ORed together using an OR function 110. In the embodiment illustrated in FIG. 1, each module 104 includes an enable input E. Activating E causes PRBS 106 to calculate the next value in its sequence, which is ORed with the value stored within MASK 108 and output via a driver or buffer circuit 112. In the embodiment illustrated in FIG. 1, only one module 104 is enabled at a time, via enable signals 114, and the enabled module's value become the next output value 116 produced by system 100.

In one example embodiment, each module 104 produces a pseudo-random sequence of differing lengths. For example, if system 100 includes seven modules 104 (N=7), then $PRBS_7$ may produce a pseudo-random sequence that is 7 bits wide and thus produces a repeating sequence of 128 values, i.e., a PRBS of length 128. $PRBS_6$ may produce a pseudo-random sequence that is 6 bits wide and thus produces a repeating sequence of 64 values, i.e., a PRBS of length 64. $PRBS_5$ may produce a 5 bit wide sequence having a PRBS of length 32, $PRBS_4$ may produce a 4-bit wide sequence having a PRBS of length 16, and so on, with $PRBS_1$ having a 1-bit wide sequence having a PRBS of length 2 and $PRBS_0$ having a 0-bit wide sequence and producing only a single value when selected. In this embodiment, system 100 can produce a uniform random shuffle sequence of any length from 2 up to 255, by selectively activating or deactivating specific modules 104. This will be described in more detail further below.

MASK 108 values modify the output of PRBS 106 to produce a pseudo-random bit sequence that occupies a particular slice of the total number of sequences produced by system 100. This is illustrated in Table 1, below, which shows an example embodiment for producing a uniform random shuffle sequence of length 15, which produces binary values in the range 0000-1110. In this configuration, only $PRBS_3$, $PRBS_2$, $PRBS_1$, and $PRBS_0$ are needed. If system 100 includes additional PRBSes, such as $PRBS_4$, $PRBS_5$, and so on, those PRBSes are not needed to produce a shuffle length of 15 and may be disabled or otherwise not used. (They would be enabled and used for longer shuffle lengths.)

TABLE 1

| PRBS# | Width | Output range | Mask value | Output values |
|---|---|---|---|---|
| 3 | 3 | 000 | 0000 | 0000 |
|   |   | 001 |   | 0001 |

TABLE 1-continued

| PRBS# | Width | Output range | Mask value | Output values |
|---|---|---|---|---|
|  |  | 010 |  | 0010 |
|  |  | 011 |  | 0011 |
|  |  | 100 |  | 0100 |
|  |  | 101 |  | 0101 |
|  |  | 110 |  | 0110 |
|  |  | 111 |  | 0111 |
| 2 | 2 | 00 | 1000 | 1000 |
|  |  | 01 |  | 1001 |
|  |  | 10 |  | 1010 |
|  |  | 11 |  | 1011 |
| 1 | 1 | 0 | 1100 | 1100 |
|  |  | 1 |  | 1101 |
| 0 | 0 | 0 | 1110 | 1110 |

It can be seen in Table 1 that each PRBS 106 produces a different slice of the output values. When selected, $PRBS_3$ produces pseudo-random values in the range of 0-7, $PRBS_2$ produces pseudo-random values in the range 8-11, $PRBS_1$ produces pseudo-random values in the range 12-13, and $PRBS_0$, when selected, outputs the value 14. In this manner, MASK 108 values define the slice of output values produced by a particular module 102.

Table 2 shows another example, in which system 100 is configured to produce a uniform random shuffle sequence of length 11, which produces binary values in the range 0000-1010. In this configuration, $PRBS_2$ is not used.

TABLE 2

| PRBS# | Width | Output range | Mask value | Output values |
|---|---|---|---|---|
| 3 | 3 | 000 | 0000 | 0000 |
|  |  | . |  | . |
|  |  | . |  | . |
|  |  | . |  | . |
|  |  | 111 |  | 0111 |
| 2 | 2 | 00 | — | — |
|  |  | . |  |  |
|  |  | . |  |  |
|  |  | . |  |  |
|  |  | 11 |  |  |
| 1 | 1 | 0 | 1000 | 1000 |
|  |  | 1 |  | 1001 |
| 0 | 0 | 0 | 1010 | 1010 |

The embodiment illustrated in FIG. 1 is intended to be illustrative and not limiting. For example, the output drivers 112 may be replaced by a selection circuit that accepts as input the enable signals 114, which are used to logically select the output of one of the OR functions 110 as the next output value 116.

Figure 2:
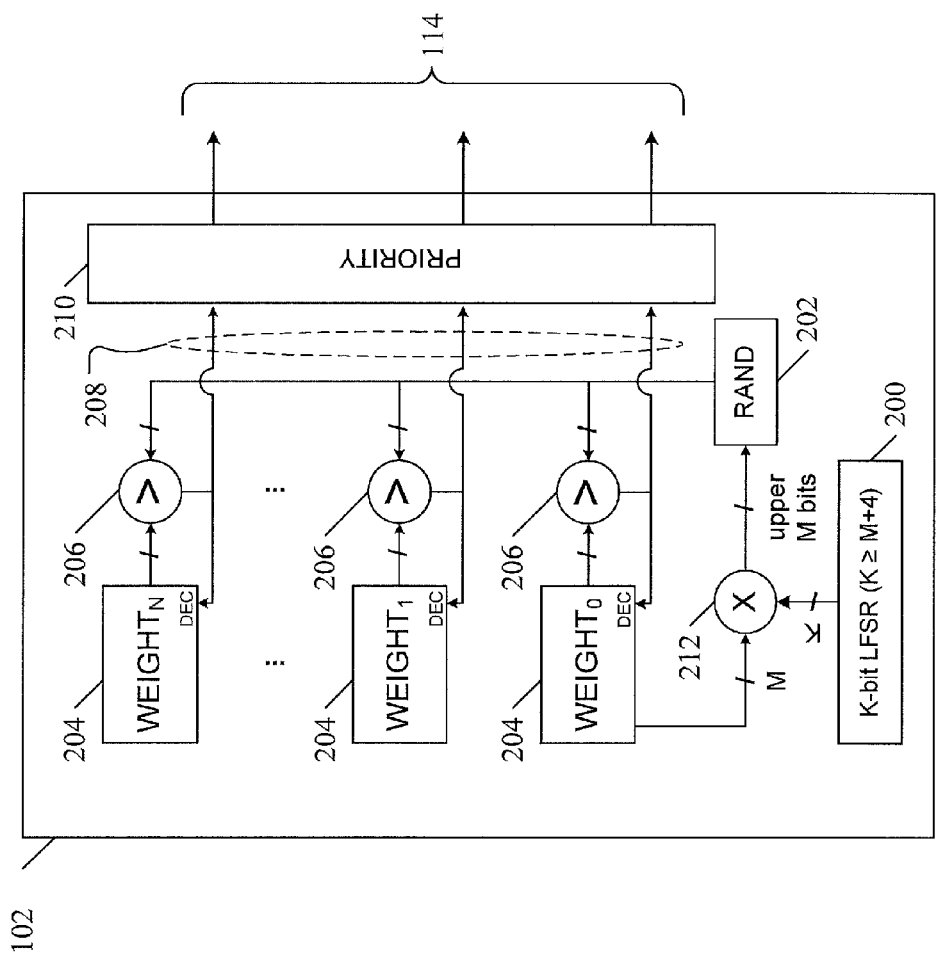
FIG. 2 is a block diagram illustrating in more detail a weighted random selection circuit according to an embodiment of the subject matter described herein.

FIG. 2 is a block diagram illustrating in more detail a weighted random selection circuit according to an embodiment of the subject matter described herein. The weighted random selection circuit will now be described with reference to FIGS. 1 and 2. In the embodiment illustrated in FIG. 2, weighted random selector 102 activates one selection line 114 at a time according to a randomizing algorithm. In one embodiment, selector 102 includes a K-bit linear-feedback shift register (LFSR) 200 that creates an M-bit random value, which is stored in RAND 202.

In one embodiment, selector 102 contains a weighting circuit for each selection line 114, e.g., one weighting circuit per module 104 as shown in FIG. 1 available for selection. In the embodiment illustrated in FIG. 2, selector 102 includes a WEIGHT 204 register for storing a number that is used to calculate a weight for the module 104 that is connected to the corresponding selection line 114.

During operation, LFSR 200 generates a random or pseudorandom value, which is stored in register RAND 202. The value stored in RAND 202 is compared to values stored in each WEIGHT register 204, via comparison circuits 206, and if the value in RAND 202 is less than the value stored in WEIGHT 204, the output of comparison circuit 206 goes active, which causes the value within WEIGHT 204 to be decremented by one and which is also provided as an input 208 into a priority circuit 210. Priority circuit 210 activates a select line 114 that corresponds to the input 208 from the highest-priority module, which in the embodiment illustrated in FIG. 2 is the module having the highest N number. The selected module 104 provides the value to OUTPUT 116, and the process repeats. Each time a new random number is loaded to RAND 202, at least one of the WEIGHT 204 registers will be decremented.

In the embodiment illustrated in FIG. 2, during operation, LFSR 200 produces a random value between 0 and one less than the value stored in the WEIGHT register 204 for module 0 ("WEIGHT0"). Thus, as random values are produced, the range of possible random values gets progressively smaller. The values stored in WEIGHT 204 registers operate to partition the range of possible random values into distinct portions or "slices". Each slice is assigned to a particular select line 114 (and by extension to the particular module 104 to which the select line 114 is connected.) During operation, the values stored in the WEIGHT registers 204 are manipulated to cause the size of the portion (or "slice") allocated to a particular module 104 to decrease every time that the particular module is selected. To explain how this works, an example would be helpful.

An example use of the WEIGHT 204 registers will now be described for a system having four modules 104, e.g., that produces a random value between 0 and 14.

TABLE 3

| MOD # (N) | Width | # of Values | Slice allocated | Weight |
|---|---|---|---|---|
| 3 | 3 | 8 | 0, 1, 2, 3, 4, 5, 6, 7 | 8 |
| 2 | 2 | 4 | 8, 9, 10, 11 | 12 |
| 1 | 1 | 2 | 12, 13 | 14 |
| 0 | 0 | 1 | 14 | 15 |

Table 3 is a list of modules 104 by module number (column "MOD #"), showing each module's PRBS width (column "Width"), number of values in its pseudorandom sequence (column "# of Values"), the range of possible output values which that module will be responsible for providing, e.g., its "slice" of the possible output values (column "Slice allocated"), and the value that will be put into that module's WEIGHT register 204 (column "Weight".) When selected, module 3 will produce output values in the range from 0 to 7, module 2 will produce output values in the range from 8 to 11, module 1 will produce output values of 12 and 13, and module 0 will produce the output value of 14. The range of values allocated to each module is controlled by the values stored in the respective WEIGHT registers 204.

Using Table 3 as a starting point, the initial value of WEIGHT0 is "15", so the first value produced by LFSR 200 and stored in RAND 202 will be a value between 0 and 14. Table 4 shows the progression of values stored within selector 102 during an example operation. Columns represent operation cycles.

TABLE 4

| Cycle | 0 | 1 | 2 | 3 | 4 | 5 | 6 | 7 | 8 | ... |
|---|---|---|---|---|---|---|---|---|---|---|
| WEIGHT3 | 8 | 8 | 7 | 7 | 6 | 6 | 6 | 5 | 5 | ... |
| WEIGHT2 | 12 | 11 | 10 | 10 | 9 | 8 | 8 | 7 | 7 | ... |
| WEIGHT1 | 14 | 13 | 12 | 11 | 10 | 9 | 9 | 8 | 7 | ... |
| WEIGHT0 | 15 | 14 | 13 | 12 | 11 | 10 | 9 | 8 | 7 | ... |
| RAND | - | 9 | 2 | 11 | 5 | 8 | 9 | 3 | 7 | ... |
| SELECTED | - | 2 | 3 | 1 | 3 | 2 | 0 | 3 | 1 | ... |

In the example illustrated in Table 4, WEIGHTS for modules 3, 2, 1, and 0, respectively are 8, 12, 14, and 15, as shown at time zero. At cycle 1, a random number between 0 and 15 (the value stored in WEIGHT0) is generated. In this example, the number generated was a "9". The value of 9 is not less than the value of WEIGHT3, so it does not change. 9 is less than the values stored in WEIGHT2, WEIGHT1, and WEIGHT0, however, so they are decremented and their new values are shown in the column for cycle 1. In this table, decremented values are highlighted with underlines. In cycle 1, the inputs 208 corresponding to MOD2, MOD1, and MOD0 are all active, but only the highest priority module, MOD2, will be selected by priority circuit 210, as shown in the bottom row of Table 4. In this table, modules selected, e.g., that provide the next value in the output sequence, are shown in reverse color, i.e., white text on black background.

During cycle 2, a random number between 0 and 13 will be generated. In this example, the next number generated was a "2". Since 2 is less than the values of WEIGHT3, WEIGHT2, WEIGHT1, and WEIGHT0, all of these registers will be decremented, inputs 208 corresponding to MOD3, MOD2, MOD1, and MOD0 will be active, and priority circuit 210 will activate only the select line for the module having the highest priority, e.g., MOD3.

During cycle 3, a number between 0 and 12 is generated, e.g., "11". Since 11 is less than the values stored in WEIGHT1 and WEIGHT0, only the values of WEIGHT1 and WEIGHT0 will be decremented and only those inputs 208 will be active, of which WEIGHT1 is the highest priority. Thus, module MOD1 will be activated. This process continues until the values of all WEIGHT registers reach zero.

Notice that in cycle 6, the value of WEIGHT1 and WEIGHT0 are the same. This means that, from this point on and until the WEIGHT values are reinitialized, e.g., to start another shuffle sequence, module MOD0 will never be selected because the next higher priority module, MOD1, will also be selected at the same time and MOD1 will always have priority over MOD0. This is expected, however, since MOD0 should only be selected once, i.e., to output value "14" (see table 3.) Notice also that in cycle 8, the values of WEIGHT2, WEIGHT1, and WEIGHT0 are the same. This means that, from this point on, modules MOD0 and MOD1 will never be selected because the next higher priority module, MOD2, will also be selected at the same time and MOD2 will always have priority over MOD1 and MOD0. This is also expected, since MOD1 should only be selected twice, i.e., to output values "12" and "13" (see table 3.) In this manner, once a particular module has output all of its possible values, that module will not be selected again until the system is reinitialized to output another full shuffle sequence.

Thus, each module 104 is initially assigned a "slice" of values having a width that corresponds to the number of values that the particular module can provide. It can be seen that as each module 104 is selected to provide an output 116, the width of its allocated slice is reduced relative to the widths of the unselected modules 104. In this manner, the likelihood that the selected module 104 will be selected by the next random number stored in RAND 202 is correspondingly reduced. The relative widths of the slices are controlled by the values loaded into the WEIGHT 204 registers. In the embodiment illustrated in FIG. 2, the width of module MOD N is $(WEIGHT_{N-1}-WEIGHT_N.)$ If $WEIGHT_{N-1}=WEIGHT_N$, then the width of MOD N=0, and MOD N is effectively disabled.

Table 5 shows the modules 104 that would be enabled/disabled to generate a randomly shuffled sequence of length L. An X indicates an enabled module, while an empty cell indicates a disabled module.

TABLE 5

| | L | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| MOD 3 | | | | | | | | X | X | X | X | X | X | X | X |
| MOD 2 | | | | X | X | X | X | | | | | X | X | X | X |
| MOD 1 | | X | X | | | X | X | | | X | X | | | X | X |
| MOD 0 | X | | X | | X | | X | | X | | X | | X | | X |

As can be seen from Table 5, for generation of uniform, random shuffled sequence having 10 values, modules MOD3 and MOD1 would be enabled and other modules disabled: MOD3 would provide 8 of the 10 values while MOD1 would provide the remaining 2 of the 10 values. By enabling or disabling particular modules, a uniform randomly shuffled sequence of specific lengths may be generated. In this embodiment, the same piece of hardware may be reconfigured quite flexibly. Adding other modules, e.g., MOD 4, MOD 5, etc., sequences of greater lengths can be generated.

The weighted random selection logic shown in FIG. 2 is illustrative and not intended to be limiting. Other techniques for generating weighted random selection of outputs 116 are contemplated and may be employed within system 100.

Figure 3:
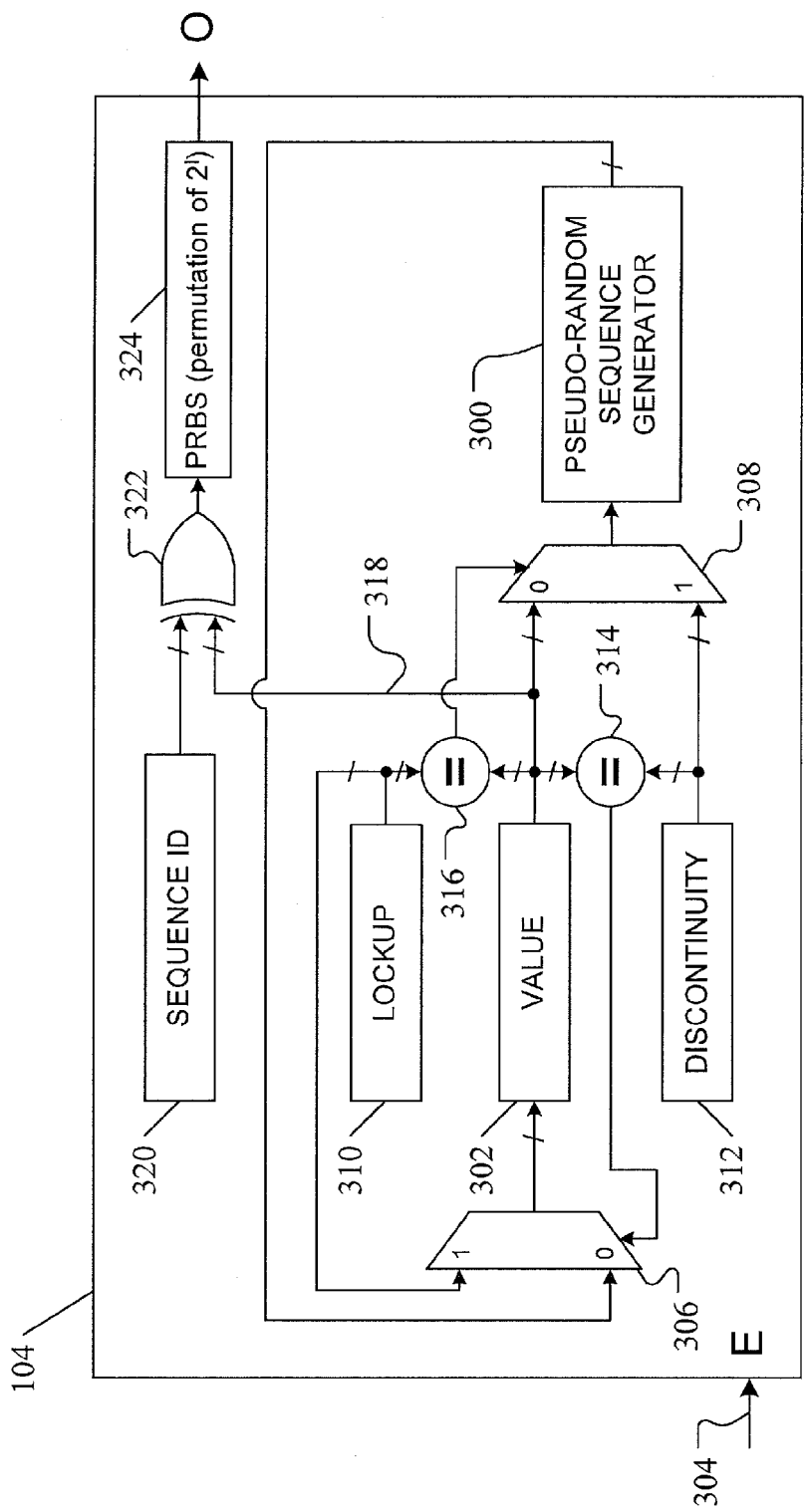
FIG. 3 is a block diagram illustrating in more detail an exemplary module for generating a pseudorandom bit sequence according to an embodiment of the subject matter described herein.

FIG. 3 is a block diagram illustrating in more detail an exemplary module for generating a pseudorandom bit sequence according to an embodiment of the subject matter described herein. The module for generating a pseudorandom bit sequence will now be described with reference to FIGS. 1 and 3. In the embodiment illustrated in FIG. 3, module 104 includes a pseudo-random sequence generator (PRSG) 300. In one embodiment, PRSG 300 includes a linear feedback shift register. During operation a VALUE register 302 holds the next value in the sequence to be provided by module 104 upon activation of an enable input 304. In the embodiment illustrated in FIG. 1, for example, select lines 114 are connected to the enable inputs for modules 104. VALUE 302 gets its next value via a selector 306, which normally selects the output of PRSG 300 as the source of the data to be stored in VALUE 302. Likewise, PRSG 300 gets as its next input via a second selector 308, which normally selects the output of VALUE 302 as the source of data to be provided to PRSG 300. Thus, for the majority of the operation of module 104, PRSG 300 produces the next VALUE 302, which is the next input for PRSG 300, which produces the next VALUE 302, and so on.

One disadvantage to using an LFSR to generate a pseudo-random sequence, however, is that an M width LFSR produces $2^M-1$ values, not $2^M$ values. The value not produced by an LFSR is referred to as the "lockup" value, because its appearance would cause the LFSR to continue to generate that same value from that point on, causing the LFSR to appear to have locked up. For XOR-type LFSRs, for example, the lockup value is all zeros.

For this reason, each module 104 includes a LOCKUP register 310 for storing the lockup value. A DISCONTINUITY register 312 stores a value from the list of values produced by LFSR 300. When the value stored in VALUE 302 matches the value in DISCONTINUITY 312, as determined by comparison circuit 314, for example, selector 306 chooses the output of LOCKUP 310 as the next VALUE 302. In the subsequent cycle, a second comparison circuit 316 detects that VALUE 302 contains the lockup value, and instructs selector 308 to send the DISCONTINUITY value as the next input into PRSG 300 rather than the lockup value currently present in VALUE 302 so that PRSG 300 does not lock up. The lockup value currently present in VALUE 302 causes comparison circuit 314 to change selector 306 back to its normal state. The next number produced by PRSG 300 will be the value in the sequence after DISCONTINUITY. In this manner, module 104 has the ability to insert the lockup value at any place into the PRSG sequence, where DISCONTINUITY 312 defines the insertion point. The addition of LOCKUP 310 and DISCONTINUITY 312 creates a module that produces the full $2^M$ set of pseudorandom values.

In one embodiment, the PRBS sequence created by PRSG 300 may be further scrambled to provide additional randomization. In the embodiment illustrated in FIG. 3, for example, the output of VALUE 302 may be modified before being output by module 104 by performing an XOR operation using sequence identity register SEQID 320 and an exclusive OR circuit 322 and storing the result of the XOR in an output value register 324. The XOR operation changes the order of the PRBS sequence.

The values stored in DISCONTINUITY 312 and/or SEQID 320 may be changed, e.g., after every full output sequence, to further randomize the results so that the shuffle sequence values change from run to run. In one embodiment, DISCONTINUITY 312 and SEQID 320 may be separate LFSRs, or slices of a larger LSFR. Likewise, each module 104 may have its own LFSR for that purpose or they may all share slices of an even larger LFSR for that purpose. Other embodiments are also contemplated, including hard-coded values for DISCONTINUITY and SEQID, including user-programmable registers for these values, which may automatically increment or decrement at the beginning of each run, and so on.

Figure 4:
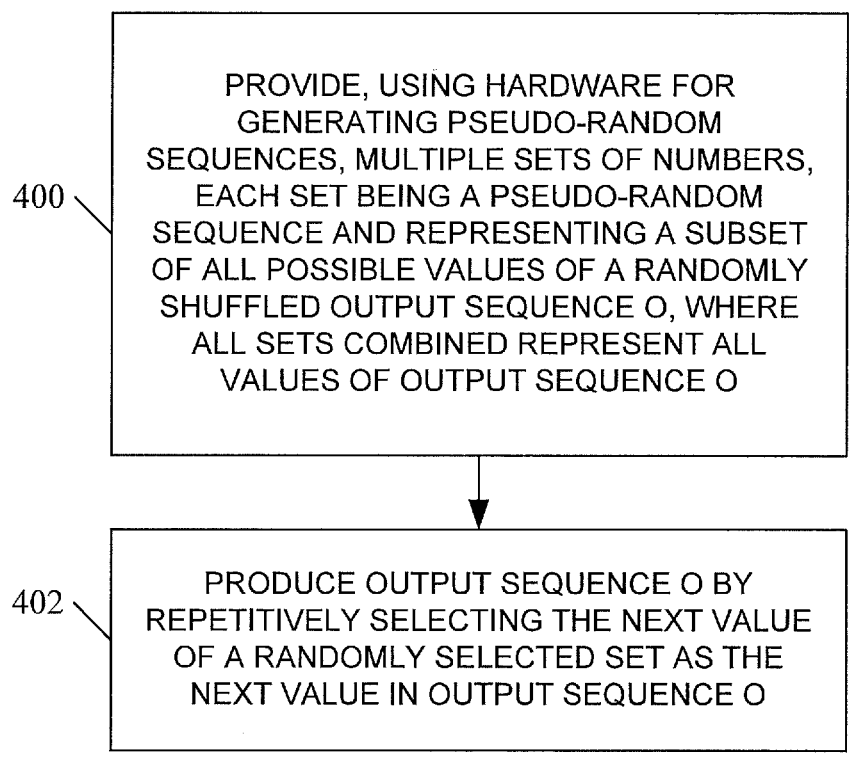
FIG. 4 is a flow chart illustrating an exemplary process for hardware implementation of uniform random shuffling according to an embodiment of the subject matter described herein.

FIG. 4 is a flow chart illustrating an exemplary process for hardware implementation of uniform random shuffling according to an embodiment of the subject matter described herein.

Step 400 includes providing multiple sets of numbers using hardware for generating pseudo-random sequences, each set being a pseudo-random sequence that represents a subset of all possible values of a randomly shuffled sequence O, where all sets combined represent all values of sequence O. In the embodiment illustrated in FIG. 1, for example, system 100 includes multiple modules 104, each module 104 having hardware (PRBS 106, MASK 108, etc.) for producing a pseudo-random sequence.

Step 402 includes producing sequence O by repetitively selecting the next value of a randomly selected set as the next value in sequence O. In the embodiment illustrated in FIG. 1, for example, system 100 includes a selector 102 for randomly selecting one of the modules 104 to provide the next value in the output sequence O. The selector 102 and modules 104 operate together to produce randomly shuffled output sequence O.

Figure 5:
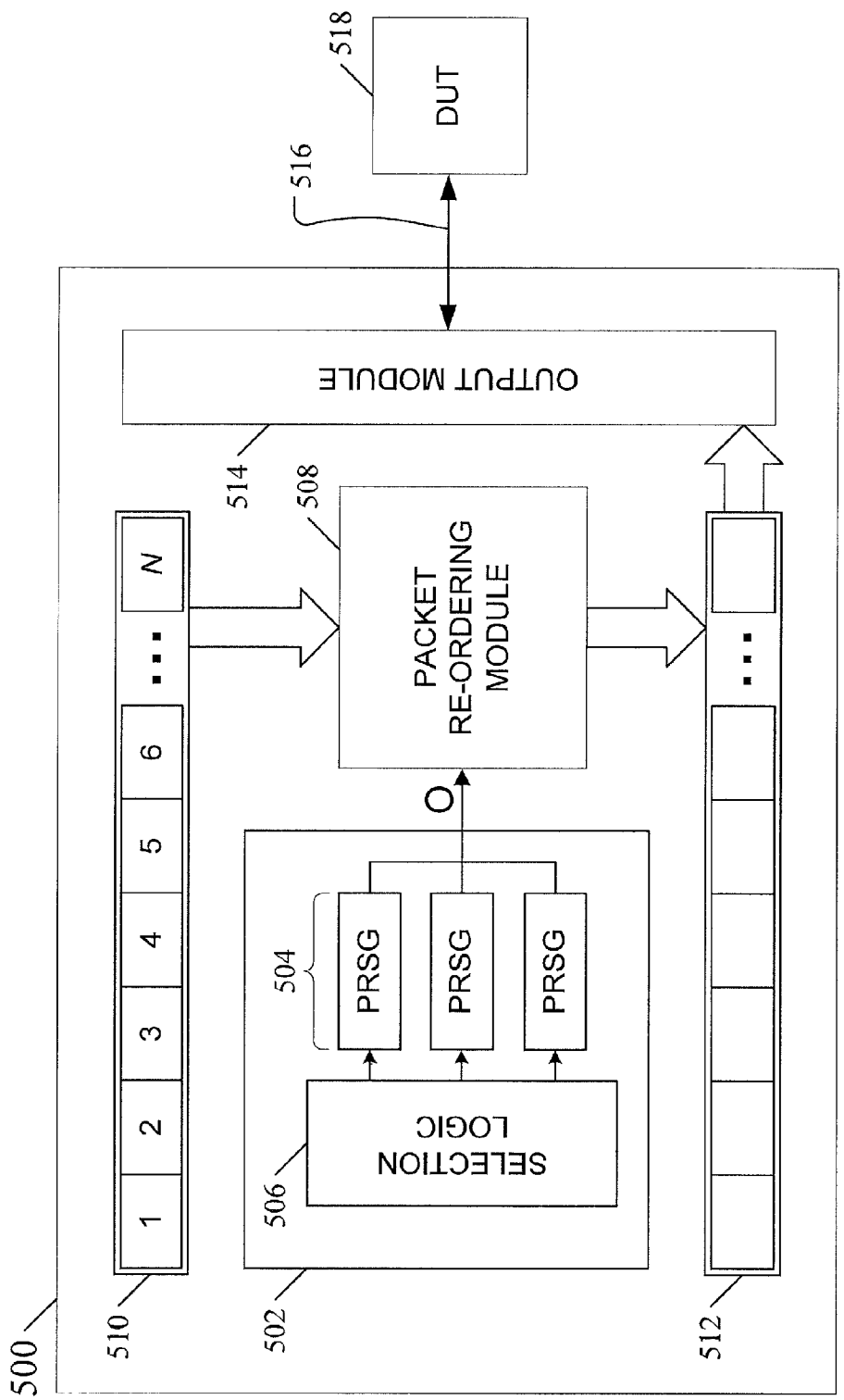
FIG. 5 is a block diagram illustrating a system for performing impairment testing of a packet network device according to an embodiment of the subject matter described herein.

FIG. 5 is a block diagram illustrating a system for performing impairment testing of a packet network device according to an embodiment of the subject matter described herein. In the embodiment illustrated in FIG. 5, system 500 includes sequence generation module 502 for generating a random set of numbers used to define a shuffling sequence O. In one embodiment, sequence generation module 502 includes a set of one or more pseudorandom sequence generation (PRSG) modules 504. Each PRSG module 504 generates its own pseudo-random sequence of numbers and outputs the next value in its pseudo-random sequence in response to an output request. Sequence generation module 502 includes selection logic 506 for creating shuffling sequence O by repetitively selecting one of the PSRG modules 504 at random and sending an output request to the selected module. The shuffling sequence O created from the output of the randomly selected modules in this manner is a uniform, randomly shuffled sequence.

In the embodiment illustrated in FIG. 5, system 500 includes a packet reordering module 508 for fragmenting a first network packet 510 into a set of sequentially ordered fragments {1, 2, 3, . . . , N} and shuffling the order of the fragments according to the shuffling sequence O. The shuffled fragments 512 may be sent individually to an output module 514 for transmittal over a network connection 516 to a device under test (DUT) 518, or they may be reassembled into a second network packet prior to being transmitted by output module 514.

For example, in one embodiment, unshuffled first network packet 510 may be stored in one location in memory and shuffled second network 512 may be stored in another location in memory, from which output module 514 retrieves the fragments to be transmitted to DUT 518. In an alternative embodiment, unshuffled network packet 510 is stored in one location in memory and output module 514 uses shuffling sequence O as an index into that memory, retrieves the fragment that is stored there, and transmits that fragment to DUT 518. This embodiment has the advantage that there is no need to store a copy of the shuffled packet 512 in memory—instead, it is created dynamically, on the fly, during the output step.

In one embodiment, sequence generation module 502 may be a system for hardware implementation of uniform random shuffling 100 as illustrated in FIGS. 1, 2, and 3.

Figure 6:
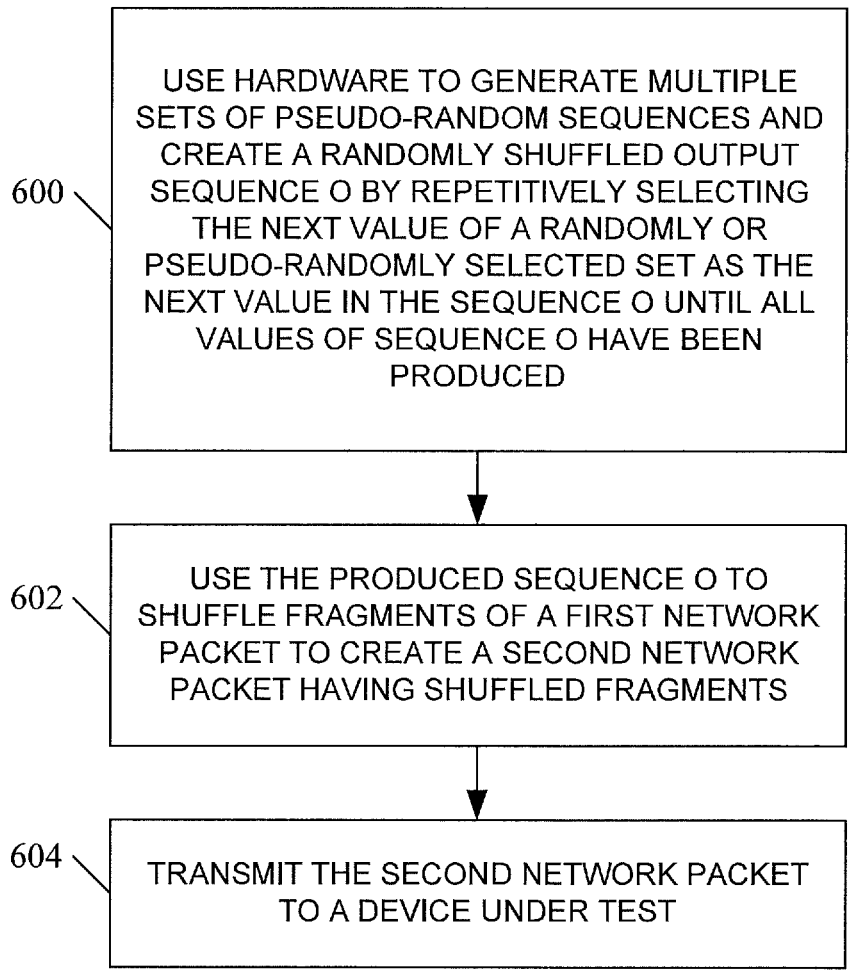
FIG. 6 is a flow chart illustrating an exemplary process for performing impairment testing of a packet network device according to an embodiment of the subject matter described herein.

FIG. 6 is a flow chart illustrating an exemplary process for performing impairment testing of a packet network device according to an embodiment of the subject matter described herein. In the embodiment illustrated in FIG. 6, the process includes, at step 600, using hardware to generate multiple sets of pseudo-random sequences and creating a randomly shuffled output sequence O by repetitively selecting the next value of a randomly or pseudo-randomly selected set as the next value in the sequence O until all values of sequence O have been produced. Step 602 includes using the produced sequence O to shuffle fragments of a first network packet to create a second network packet having shuffled fragments. Step 604 includes transmitting the second network packet to a device under test.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for hardware implementation of uniform random shuffling, the method comprising:
   providing, using hardware for generating pseudo-random sequences, a plurality of sets of numbers, wherein each set comprises a pseudo-random sequence, wherein each set represents a subset of all possible values of a randomly shuffled sequence O, and wherein all of the sets combined represent all values of the sequence O; and
   producing the sequence O by:
   (1) randomly or pseudo-randomly selecting one of the sets;
   (2) selecting a next value of the randomly or pseudo-randomly selected set as the next value in the sequence O; and
   (3) repeating steps (1) and (2) until all of the values from all of the sets have been used.

2. The method of claim 1 wherein the sets are randomly selected using a weighted random selection function and wherein each set is assigned its own weight.

3. The method of claim 2 wherein each set's weight is based on the number of values in that set that have not yet been selected for use in the sequence O.

4. The method of claim 3 wherein, for each set of numbers, the pseudo-random sequence starts at an initial value V that is programmatically selected.

5. The method of claim 4 wherein the pseudo-random sequence stops when the next value in the sequence is again V.

6. The method of claim 4 wherein, for each set of numbers, the value V for that set changes after all values in the sequence O have been produced.

7. The method of claim 6 wherein the value of V changes according to a second pseudo: random sequence.

8. The method of claim 1 wherein, for each set of numbers, the value being output by that set is modified by a modification function M for that set before being included in the sequence O.

9. The method of claim 8 wherein, for each set of numbers, modification function M changes after all values in the sequence O have been produced.

10. A method for performing impairment testing of a packet network device, the method comprising:
    using hardware to generate a plurality of sets of pseudo-random sequences and creating a randomly shuffled output sequence O by:
    (1) randomly or pseudo-randomly selecting one of the sets;
    (2) selecting a next value of the randomly or pseudo-randomly selected set as a next value in the sequence O; and
    (3) repeating steps (1) and (2) until all values of the sequence O have been produced;
    using the produced sequence O to shuffle fragments of a first network packet to create a second network packet having shuffled fragments, which are transmitted to a device under test.

11. A system for hardware implementation of uniform random shuffling, the system comprising:
    a plurality of modules, wherein each module generates its own pseudo-random sequence of numbers S and wherein each module outputs the next value in its pseudo-random sequence in response to an output request; and
    selection logic for creating a sequence of output values O by:
    (1) randomly or pseudo-randomly selecting one of the plurality of modules;
    (2) sending an output request to the selected module; and
    (3) repeating steps (1) and (2) until the sequence of values O has a desired length, wherein the sequence of values O created from the output of the randomly or pseudo-randomly selected modules comprises a uniform, randomly shuffled sequence.

12. The system of claim 11 wherein randomly or pseudo-randomly selecting one of the modules comprises using a weighted random selection function and wherein each module is assigned its own weight.

13. The system of claim 12 wherein each module's weight is calculated based on the number N of pseudo-random values that have not yet been output out of L possible values in the sequence S produced by that module.

14. The system of claim 11 wherein, for each module, the pseudo-random sequence starts at an initial value V that is programmatically selected.

15. The system of claim 14 wherein, for each module, the value V changes after all values in sequence S have been output by that module.

16. The system of claim 15 wherein the value of V changes according to a second pseudorandom sequence.

17. The system of claim 11 wherein, for each module, the value being output by that pseudo-random sequence is modified by a modification function for that module before being output by that module.

18. The system of claim 17 wherein the modification function exclusive-ORs the value being output by the pseudo-random sequence with a modification value M to produce the value being output by that module.

19. The system of claim 18 wherein, for each module, the value M changes after all values in sequence S have been output by that module.

20. A system for performing impairment testing of a packet network device, the system comprising:
    a shuffling module for randomly shuffling a set of numbers to create a shuffling sequence O, wherein the shuffling module comprises a plurality of modules, wherein each module generates its own pseudo-random sequence of numbers and wherein each module outputs the next value in its pseudo-random sequence in response to an output request, wherein the shuffling module comprises selection logic for creating the shuffling sequence O by:
    (1) randomly or pseudo-randomly selecting one of the modules;

(2) sending an output request to the selected module; and (3) repeating steps (1) and (2) until the shuffling sequence O has a desired length, wherein the shuffling sequence O created from the output of the randomly or pseudo-randomly selected modules comprises a uniform, randomly shuffled sequence;

a packet reordering module for fragmenting a first network packet into a plurality of sequentially ordered fragments, shuffling the order of the fragments according to the shuffling sequence O, and assembling the shuffled fragments into a second network packet; and an output module for transmitting the second network packet to a device under test.

21. A non-transitory computer readable medium having stored thereon executable instructions that when executed by the processor of a computer control the computer to perform steps comprising:

providing, using hardware for generating pseudo-random sequences, a plurality of sets of numbers, wherein each set comprises a pseudo-random sequence, wherein each set represents a subset of all possible values of a randomly shuffled sequence O, wherein all of the sets combined represent all values of the sequence O; and producing the sequence O by:

(1) randomly or pseudo-randomly selecting one of the sets;

(2) selecting a next value of the randomly selected set as the next value in the sequence O; and (3) repeating steps (1) and (2) until all of the values from all of the sets have been used.

\* \* \* \* \*